(No Model.)
J. W. MOFFITT.
ARTIFICIAL TEETH.
No. 378,015. Patented Feb. 14, 1888.
Fig. 1
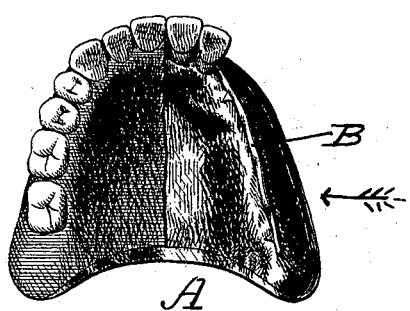
Fig. 3. Fig. 4.
 
Fig. 2
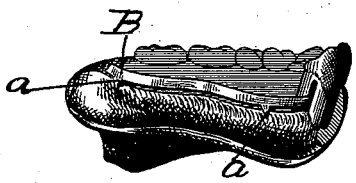
Fig. 6. Fig. 7.
 
Fig. 5.
WITNESSES:
Edw. F. Simpson Jr.
E. A. Ridgway
John W. Moffitt
INVENTOR,
by his Atty
Wm. J. Peyton

UNITED STATES PATENT OFFICE.

JOHN W. MOFFITT, OF PHILADELPHIA, PENNSYLVANIA, ASSIGNOR TO THE S. S. WHITE DENTAL MANUFACTURING COMPANY, OF SAME PLACE.

ARTIFICIAL TOOTH.

SPECIFICATION forming part of Letters Patent No. 378,015, dated February 14, 1888.

Application filed August 18, 1887. Serial No. 247,279. (No model.)

*To all whom it may concern:*

Be it known that I, JOHN W. MOFFITT, a citizen of the United States, residing at Philadelphia, in the county of Philadelphia and State of Pennsylvania, have invented certain new and useful Improvements in Artificial Teeth; and I do hereby declare the following to be a full, clear, and exact description of the invention, such as will enable others skilled in the art to which it appertains to make and use the same.

My invention relates to improvements more especially in artificial teeth for what is known as "continuous gum-work."

Heretofore various objections and difficulties have been met with in this class of artificial dentures, chief among which have been the lack of security in the attachment of the teeth to the platinum plate or base while applying what is known as the "body" and before it is baked, in the old way; also much solder had to be used to attach the fastening-rim to the plate, and in reheating, which is often necessary, the gold solder is converted in oxide, which forms more or less gaseous matter, discoloring the surface of the denture and blistering it. Another serious objection was that the teeth had to be soldered to the fastening-rim.

The objects of my present invention are to overcome the difficulties of manufacture heretofore experienced, which ends I attain by a new form of tooth and by a new process of fitting it to the fastening rim and the fastening-rim to the plate or base.

The accompanying drawings illustrate my invention sufficiently to enable it to be practiced, and in said drawings—

Figure 1 is a view of a denture, showing one side as completed and on the other side steps toward completion; and Fig. 2 an edge view thereof, looking in the direction of the arrow, Fig. 1. Figs. 3 and 4 are side views of an incisor and bicuspid tooth, respectively, of my improved construction. Fig. 5 is a portion of the fastening-rim constructed in the improved way. Fig. 6 is a side view of a tooth of the old form, showing the metal pin extending from the back thereof; and Fig. 7 a view thereof with the pin bent over the fastening-rim ready to be soldered thereto.

As heretofore, I prefer to use a platinum plate or base, A, shaped and fitted as before; but instead of soldering the fastening-rim B thereto all the way round with the pure gold solder, I form said rim with oppositely-bent lips *a a* at four different points—as, for instance, at the points on the plate between where the cuspids and first bicuspids will come and at the rear ends of the rim, and solder said rim to said plate by these lips.

The teeth are provided with narrow parallel wall-slots to nicely fit over or straddle said rim when soldered to its plate; and hence no solder to secure the teeth on the rim or to the plate is required, and they may be adjusted on the rim to suit the requirements of the case in hand; and said rim is also bent, as required, to secure the necessary adjustments. The bases or necks of the teeth are of course ground to fit the plate on each side of the rim B.

The body of the continuous gum-work, which is the gum portion and enamel of the denture, is or may be applied in the usual way and need not be set out herein by me, as the method is well known in the art.

I do not claim in this application the improved tooth herein shown and described, as I will make it the subject of another application.

I claim herein as my invention—

The method of making a continuous gum-work artificial denture, hereinbefore described, consisting in soldering the fastening-rim by lips thereon at intervals to the plate, then fitting straddling teeth on said rim, and then building up the body, substantially as hereinbefore set forth.

In testimony whereof I affix my signature, in presence of two witnesses, this 30th day of July, 1887.

JOHN W. MOFFITT.

Witnesses:
J. A. B. WILLIAMS,
ROBT. E. GORDON.